United States Patent [19]

Funayama et al.

[11] Patent Number: 5,128,286
[45] Date of Patent: Jul. 7, 1992

[54] BORON-CONTAINING, SILICON NITRIDE-BASED CERAMIC SHAPED BODY

[75] Inventors: Osamu Funayama; Mikiro Arai, both of Iruma; Hiroyuki Aoki, Kamifukuoka; Yuuji Tashiro; Toshio Katahata, both of Iruma; Kiyoshi Sato, Kamifukuoka; Takeshi Isoda, Niiza; Tadashi Suzuki, Iruma; Ichiro Kohshi, Kamifukuoka, all of Japan

[73] Assignee: Tonen Corporation, Japan

[21] Appl. No.: 539,177

[22] Filed: Jun. 18, 1990

[30] Foreign Application Priority Data

Jun. 20, 1989 [JP] Japan ................... 1-157191
Jul. 17, 1989 [JP] Japan ................... 1-183922

[51] Int. Cl.⁵ .............................................. C04B 35/46
[52] U.S. Cl. ................................... 501/97; 528/4; 528/7; 528/8
[58] Field of Search ............... 501/96, 97; 528/4, 7, 528/8

[56] References Cited

U.S. PATENT DOCUMENTS

| 4,167,616 | 9/1979 | Bollinger | 526/197 |
| 4,405,687 | 9/1983 | Morita et al. | 428/383 |
| 4,550,151 | 10/1985 | Takamizawa et al. | 528/7 |
| 4,590,034 | 5/1986 | Hirano et al. | 419/13 |
| 4,707,556 | 11/1987 | Paciorek | 556/403 |
| 4,731,437 | 3/1988 | Taniguchi et al. | 528/394 |
| 4,743,662 | 5/1988 | Lipowitz | 525/474 |
| 4,810,436 | 3/1989 | Johnson | 264/29.1 |
| 4,832,895 | 5/1989 | Johnson | 264/29.1 |
| 4,851,491 | 7/1989 | Riccitiello et al. | 528/4 |
| 4,857,490 | 8/1989 | Johnson | 501/96 |
| 4,910,173 | 3/1990 | Niebylski | 501/97 |
| 4,921,925 | 5/1990 | Niebylski | 528/5 |
| 4,931,100 | 6/1990 | Johnson | 106/163.1 |
| 4,939,222 | 7/1990 | Mignani et al. | 528/5 |

FOREIGN PATENT DOCUMENTS

| 0161751 | 11/1985 | European Pat. Off. . |
| 0175382 | 3/1986 | European Pat. Off. . |
| 0262914 | 6/1988 | European Pat. Off. . |
| 0325483 | 7/1989 | European Pat. Off. . |
| 0344870 | 12/1989 | European Pat. Off. . |

Primary Examiner—William R. Dixon, Jr.
Assistant Examiner—Alan Wright
Attorney, Agent, or Firm—Lorusso & Loud

[57] ABSTRACT

A shaped body is disclosed which comprises substantially amorphous, silicon nitride-based ceramic containing Si, N and B as essential components and O, C and H as optional components in amounts providing the following atomic ratios:

N/Si: 0.05 to 2.5,
B/Si: 0.01-3,
O/Si: 2.0 or less,
C/Si: 1.5 or less, and
H/Si: 0.1 or less.

9 Claims, No Drawings

BORON-CONTAINING, SILICON NITRIDE-BASED CERAMIC SHAPED BODY

BACKGROUND OF THE INVENTION

This invention relates to silicon nitride-based, shaped ceramic bodies having high resistance to heat, oxidation and wear and excellent mechanical strengths and high modulus.

Silicon nitride has been attracting much attention for its favorable properties, and the research thereof has recently led to remarkable developments. It has been already utilized for a wide variety of applications such as for the production of cutting tools, mechanical seals, etc., for its resistance to at and wear, and will find wide use for bearings, turbosupercharger rotors, etc., in the near future. It will play an important role in the production of gas turbine blades, adiabatic engines, heat exchangers for high-temperature gas furnaces and other equipments which are operated under very severe conditions.

Among various shaped bodies, fibers of silicon nitride can effectively excellent properties inherent to silicon nitride, such as mechanical strength, resistance to heat, impact, oxidation and chemicals, electrical insulation, and wettability with metals. The silicon nitride fibers have another advantage of being more amenable to molding. Economic production of the fibers, therefore, will open up new areas into which silicon nitride can make inroads. More specifically, silicon nitride will be used as a heat-resistant material for mesh belts, conveyor belts, curtain and filters, or as a reinforcing material in various composite materials for engine parts, fan blades and aircraft structures when the fibers are processed into woven fabrics, felts, ropes, yarns or chopped strands.

The following shaped ceramic bodies have been hitherto proposed:

(1) Shaped bodies formed of a homogeneous mixture of silicon carbide and silicon nitride obtained by calcining an organosilazane produced by reaction of a halogenosilane with ammonia (Japanese Published Unexamined Patent Applications Nos. 49-69717, 49-20206 and 62-202863 and U.S. Pat. No. 4,482,669);

(2) Shaped bodies of Si-N-O or Si-N-O-M series obtained by calcining perhydropolysilazane or metallopolysilazane (Japanese Patent Application No. 63-46966 and U.S. Pat. No. 4,397,828);

(3) Shaped bodies of Si-C containing ceramics obtained by calcining polycarbosilane (Japanese Published Unexamined Patent Applications Nos. 53-93314, 54-3815 and 54-16521); and (4) Shaped bodies of Si-Ti-C or Si-Zr-C series obtained by calcining polytitanocarbosilane or polyzirconocarbosilane.

The known shaped ceramic bodies have the following defects. The shaped bodies (1) above contain a large amount of free carbon because of a high carbon content in the raw material. This causes phase separation or reaction when subjected to a high temperature, resulting in deterioration of inherent properties of silicon nitride and silicon carbide, especially lowering of electrical insulation, strengths and resistance to thermal shock. The shaped bodies (2) show poor mechanical strength at high temperatures, though they have good mechanical strength at room temperature. The shaped bodies (3) and (4) require an infusiblization treatment during the course of the production process thereof, since the raw materials are melted when heated. Thus, the process becomes complicated. Additionally, the infusiblization treatment is susceptible to contamination by oxygen, resulting in lowering of mechanical strengths and resistance to heat.

SUMMARY OF THE INVENTION

The following processes have been proposed for the production of silicon nitride fibers:

(1) a process, wherein silicon monoxide (SiO) prepared by reducing silicate at a high temperature is reacted with ammonia and hydrogen at 1425° to 1455° C. to form fibrous silicon nitride, 5 to 30 μm in diameter and about 370 mm long, on a graphite substrate (Cunningham et al., 15th Nat. SAMPE Symp., 1969), (2) a process, wherein an organic polycondensate having one or more silazane (SiN) groups is melt-spun to form a fibrous polymer, which is fired in an ammonia atmosphere (Ishikawa et al., Japanese Published Unexamined Patent Application No. 57-200210), and

DESCRIPTION OF THE PREFERRED EMBODIMENT (3) a process, wherein organosilazane fibers prepared by melt spinning or dry spinning organosilazanes are fired in an inert gas atmosphere to produce silicon carbide/silicon nitride composite fibers (G. Winter et al., Japanese Published Unexamined Patent Application No. 49-69717; W. Verbeek et al., Japanese Published Unexamined Patent Application No. 49-20206; Penn et al., "J. of Applied Polymer Science", Vol. 27, 3751-3761 (1982); Penn et al., I.E.C., "Proc. Des. Dev.", Vol. 23, No. 2, 217-220 (1984); Seyferth et al., U.S. Pat. No. 4,482,669).

The above processes have the following problems. The process (1) is incapable of making silicon nitride into continuous fibers, and is not suited for mass production because of its poor controllability. The major problems associated with the processes (2) and (3) result from high carbon contents in their starting fibers, with the result that the final products will have high concentrations of silicon carbide and/or free carbon. This may sometimes cause formation of cracks, voids and pores during the pyrolysis, which will degrade some of the properties inherent in silicon nitride, such as electrical insulation, mechanical strength and resistance to thermal shocks. Furthermore, the fibers prepared by the processes (2) and (3) are insufficient in tensile strength and electrical resistivity, which are known in the art to have to be in the order of 41-142 kg/mm$^2$ and $7 \times 10^8$ ohm.cm, to be used for aerospace materials.

With the foregoing problems of the conventional silicon nitride fibers in view, the present invention contemplates the provision of a novel, silicon nitride-based shaped body which has high mechanical properties such as strength and modulus even at high temperatures of 1300°-1400° C. as well as excellent resistance to heat, chemicals and wear.

In accordance with the present invention there is provided a shaped body comprising a substantially amorphous, silicon nitride-based ceramic containing Si, N and B in amounts providing the following atomic ratios:

N/Si: 0.05 to 2.5, and
B/Si: 0.01-3.

The present invention will now be described in detail below.

In the present invention, shaped bodies include, for example, fibers, filaments, flakes, powders, films, coatings, fabrics, mats, blocks, pipes, plates, cylinders and the like molded bodies and composite articles using these materials.

The silicon nitride-based ceramic material constituting the shaped body according to the present invention is characterized by containing boron which serves to improve mechanical strengths of the shaped body at high temperatures. The reason why boron is effective in improving strengths at high temperatures has not been clarified yet but is considered to be as follows: (1) Boron whose ionic radius is smaller than that of silicon can intrude between silicon-nitrogen bond when subjected to a high temperature, so that silicon nitride is prevented from forming hexagonal crystals and is maintained in an amorphous state, which is a metastable state, up to high temperatures; (2) crystal nuclei of silicon nitride once formed are prevented from growing due to the presence of boron between nitrogen and silicon atoms, so that the amorphous state is maintained up to high temperatures.

The silicon nitride-based ceramic of the present invention may further contain, as an optional ingredient, at least one element selected from the group consisting of O, C and H. When the ceramic contains oxygen or carbon, the wettability thereof with a matrix component of a composite material is improved. The oxygen also serves to improve the elongation of the ceramic fibers. Thus, the silicon nitride-based ceramic is characterized by the following atomic ratios:

N/Si:0.05 to 2.5,
B/Si:0.01 to 3,
O/Si:2.0 or less,
C/Si:1.5 or less, and
H/Si:0.1 or less.

It is important that the contents of N, Si, B, O, C and H should be as specified above. Proportion of these components outside of the above specified range causes reduction of tensile strength, elastic modulus and/or heat resistance of the shaped ceramic bodies. Preferred atomic ratios are as follows:

N/Si:0.1 to 2.3,
B/Si:0.05-2,
O/Si:1.5 or less,
C/Si:1.2 or less, and
H/Si:0.05 or less.

More preferred ranges are as follows:

N/Si:0.5 to 2.0,
B/Si:0.1 to 1,
O/Si:1.0 or less,
C/Si:0.5 or less, and
H/Si:0.01 or less.

The shaped body of the present invention contains amorphous, silicon nitride-based ceramic containing Si, N and B. The shaped body may also be a mixture or an aggregate of such an amorphous ceramic with fine crystallites of alpha- and beta-$Si_3N_4$ having a diameter of 500 Å or less.

Preferably, the shaped body of the present invention contains silicon nitride-based ceramic containing Si, N and B which is substantially amorphous even when subjected to high temperatures of 1,500°–1,750° C. Such a shaped body may further contain fine crystallites of alpha- and beta-$Si_3N_4$ having a diameter of 500 Å or less. The thus constructed shaped body can exhibit high mechanical strengths not only at room temperature but also at temperatures higher than 1,500° C. Presumably, this is attributed to the above specific construction of the shaped body which can prevent the formation of undesirable factors such as pores, coarse particles and crystal interparticle interactions.

In the present invention, it is preferred that the ceramic shaped bodies should exhibit an X-ray small angle scattering such that the ratio of the intensity of the small angle scattering of the fibers to that of air is 1 to 20, more preferably 1–10, most preferably 1–5, at scattering angles of 0.5° and 1°, for reasons of improved mechanical properties.

The intensity of X-ray small angle scattering is related to the presence of fine pores or voids in the shaped bodies. Namely, the presence of fine pores causes localization of electron density, accounting for small angle scattering.

According to Guinier theory, scattering intensity is expressed by the following equation:

$$I(h) = (\Delta\rho)^2 V^2 \exp(-h^2 R_g^2/3)$$

wherein

I(h):scattering intensity in vector quantity h in reciprocal space,
$\Delta\rho$:difference in electron density between voids and ambit,
Rg:radius of inertia,
V:volume of scattering body,
h:$(4\pi\sin\theta)/\lambda$,
λ:wavelength of X-ray,
θ:scattering angle.

Thus, since the scattering intensity I(h) at a scattering angle θ is proportional to the volume of voids with the radius of inertia of Rg, it can be used as a measure of the amount of the voids of the fibers upon a suitable density compensation.

Measurement of a small angle scattering intensity is generally made in accordance with the method described in "Experimental Chemistry Course, No. 4, Solid Physics" (1956), Japan Chemical Society. For the purpose of the present specification, the following method is adopted: Using an X-ray small angle scattering measurement device (RJ-200B, manufactured by Rigaku Denki K.K., Japan) equipped with a position sensor proportional counter (PSPC-5), scattering intensity is measured while integrating for 1000 seconds in every 0.02° at a tube voltage of 45 KV, a tube current of 95 mA with two first and second slits of 0.2 mmφ and 0.15 mmφ, respectively. 18 Milligrams of sample bodies each having a length of 15 mm are uniformly set to a slit having a length of 10 mm and a width of 4 mm. From the scattering intensity I of the sample and that I' of ambient air are measured at scattering angles of 1° and 0.5° to calculate a scattering intensity ratio I/I'.

The molded body according to the present invention may be produced, for example, by forming a polyborosilazane into a desired shape, followed by sintering or calcining the shaped polyborosilazane under vacuum or in the atmosphere of an inert gas, a reducing gas, an oxidizing gas or a mixture thereof. The polyborosilazane is preferably a compound obtained by reacting a polysilazane having a number average molecular weight of 100–500,000 with a boron compound. The polysilazane has a main skeletal structure having the following recurring units:

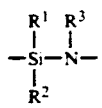

wherein $R^1$, $R^2$ and $R^3$ represent independently from each other a group or a skeletal group composed of hydrogen, a hydrocarbyl group, nitrogen, oxygen, carbon, silicon or a mixture thereof.

The hydrocarbyl group may be, for example, an alkyl, alkenyl, an aryl, a cycloalkyl or aralkyl. Examples of the alkyl group include methyl, ethyl, propyl, butyl, pentyl, hexyl, heptyl, octyl, nonyl and decyl. Examples of the alkenyl group include vinyl, allyl, butenyl, pentenyl, hexenyl, heptenyl, octenyl and decenyl. Examples of the cycloalkyl group include cyclobutyl, cyclopentyl, cyclohexyl and cycloheptyl. Examples of the aryl group include phenyl, tolyl, xylyl and naphthyl. Benzyl is an example of the aralkyl group.

Examples of suitable polysilazane compounds are given below.

(I) An inorganic cyclic or linear polysilazane having a number average molecular weight of 100-50,000 and contains the following recurring unit:

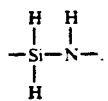

Such a polysilazane may be obtained by reacting a halosilane such as dichlorosilane with a base such as pyridine to form an adduct, and then reacting the adduct with ammonia (Japanese patent application No. 60-145,903).

(II) A reformed polysilazane having (a) a number average molecular weight of 200-500,000, preferably 500-10,000 (b) contents of Si, N and H of 50-70% by weight, 20-34% by weight and 5-9% by weight, respectively; and (c) $-SiH_2-$ and $-SiH_3$ groups, the molar ratio of the former to the latter being 2.0:1 to 8.4:1 (U.S. Pat. No. 4,861,569). The reformed polysilazane may be prepared by reacting a solution of a raw material polysilazane in an organic base-containing solvent at a temperature and for a period of time sufficient to polycondensate the raw material polysilazane.

The raw material polysilazane may be the polysilazane mentioned in (1) above or a compound disclosed in U.S. Pat. No. 4,397,328, in an article A. Stock and K. Somiesk, Ber. Dtsch. Chem. Ges., 54, 740 (1921) or in an article W. M. Scantlin, Inorganic Chem., 11, 3082-3084 (1972). The reaction temperature is generally $-78°$ C. to $300°$ C. The organic base may be phosphine, a tertiary amine such as trialkylamine, a secondary amine with sterically bulky groups. The above organic base may be used by itself or as a solution in a solvent such as a hydrocarbon solvent.

(III) A cross-linked polysilazane having a number average molecular weight of 200-500,000, preferably 500-10,000 and containing (a) a recurring unit of the formula:

wherein $R^5$ and $R^6$, independently from each other, stand for hydrogen, an alkyl, an alkenyl, a cycloalkyl, an alkylamino, aryl or an alkylsilyl, and (b) one or more cross-linkages of the formula:

wherein A stands for a direct bond or $-N(R^8)-$ where $R^8$ stands for hydrogen, an alkyl, a cycloalkyl, an aryl or an aralkyl, and $R^7$ stands for (1) hydrogen, an alkyl, an alkenyl, a cycloalkyl, an aryl, an aralkyl or $-N(R^9)(R^{10})-$ where $R^9$ and $R^{10}$, independently from each other, stand for an alkyl, a cycloalkyl, an aryl or an aralkyl, when the group A is a direct bond or (2) hydrogen, an alkyl, an alkenyl, a cycloalkyl, an aryl or an aralkyl, when the group A is $-N(R^8)-$, or (c) one or more groups of the formula:

wherein A, $R^9$ and $R^{10}$ have the same meaning as above (European patent publication No. 0304239).

The cross-linked polysilazane is preferably a compound having a number average molecular weight of 200-500,000, preferably 500-10,000 and an atomic ratio N/Si of at least 0.8 in which N are those which are directly bonded to the Si atoms and containing (a) a recurring unit of the formula $-SiH_2-NH-$ and (b) one or more cross-linkages of the formula $-NH-$, $-NHNH-$ or $-N(NH_2)-$ cross-linking the $SiH_2-NH_n$ chains. The cross-linked polysilazane may be obtained by reacting a polysilazane as described in (I) above with ammonia or hydrazine in an organic base-containing solvent such as described in (II) above.

(IV) A polysilazane containing a recurring unit of the formula

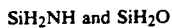

and having a polymerization degree of 5-300, preferably 5-100 (Japanese Published Unexamined Patent Application No. 62-195024).

(V) Polyorganohydrosilazane having a molecular weight of about 200-100,000 and a composition:

wherein R stands for alkyl, alkenyl, cycloalkyl, aryl, aralykyl, alkylsilyl, alkylamino, alkoxy or a group having a carbon atom directly bonded to the silicon atom of the above formula, and x is a number greater than 0.4 and smaller than 1.

The boron compound to be reacted with the above polysilazane for the production of polyborosilazane is preferably a compound of the formulas (I)-(IV):

$B(R^4)_3$ (I)

$(B^4BO)_3$ (II)

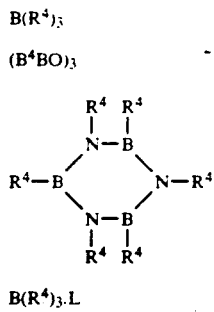 (III)

$B(R^4)_3 \cdot L$ (IV)

wherein $R^4$ represents hydrogen, halogen, alkyl having 1-20 carbon atoms, alkenyl, cycloalkyl, aryl, alkoxy, alkylamino, hydroxyl or amino, and L is a compound capable of forming a complex with $B(R^4)_3$.

Illustrative of suitable boron compounds are as follows:

Of $B(R^4)_3$, examples of those which have a halogen atom or atoms as $R^4$ include fluoroborane, tribromoborane, trifluoroborane, trichloroborane, difluoroborane, diiodoborane, iodoborane, dibromomethylborane, dichloromethylborane, difluoromethylborane, difluoromethoxyborane, diiodomethylborane, ethynyldifluoroborane, difluorovinylborane, dibromoethylborane, dichloroethylborane, dichloroethoxyborane, ethyldifluoroborane, ethyldiiodoborane, bromodimethylborane, dibromo(dimethylamino)borane, chlorodimethylborane, chlorodimethoxyborane, fluorodimethylborane, fluorodimethoxyborane, dichloroisopropylborane, dichloropropylborane, difluoropropoxyborane, bromo(dimethylamino)methylborane, chlorodivinylborane, dibromobutylborane, butyldichloroborane, butyldifluoroborane, butoxydifluoroborane, bromodiethylborane, dibromo(diethylamino)borane, chlorodiethylborane, chlorodiethoxyborane, dichloro(pentafluorophenyl)borane, dichloro(diethylamino)borane, (diethylamino)difluoroborane, bromobis(dimethylamino)borane, chlorobis(dimethylamino)borane, bis(dimethylamino)fluoroborane, dibromophenylborane, dichlorophenylborane, difluorophenylborane, difluorophenoxyborane, diiodophenylborane, dibromo(1,3-dimethyl-1-butenyl)borane, dibromo(3,3-dimethyl-1-butenyl)borane, dibromo(1-ethyl-1-butenyl)borane, dibromo-1-hexenylborane, dibromo(2-methyl-cyclopentyl)borane, 2-methylcyclopentyl-dichloroborane, dibromohexylborane, dibromo(2-methylpentyl)borane, difluoro borane, dibromo(dipropylamino)borane, chlorodipropylborane, chloro(1,1,2-trimethylpropyl)borane, dichloro(diisopropylamino)borane, butyl(dimethylamino)fluoroborane, dichloro(4-methylphenyl)borane, dichloro(methylphenylamino)borane, bromo(dimethylamino)phenylborane, chloro(dimethylamino)phenylborane, 9-bromo-9-borabicyclo[3,3,1]nonane, 9-chloro-9-borabicyclo[3,3,1]nonane, diethylaminochloro-(1-butenyloxy)borane, dichlorooctylborane, bromobis(1-methylpropyl)borane, bromodibutylborane, dibromo(dibutylamino)borane, chlorobis(2-methylpropyl)borane, dibutylchloroborane, dichloro(dibutylamino)borane, dibutylfluoroborane, bromobis(biethylamino)borane, chlorobis(diethylamino)borane, dichloro(2,4,6-trimethylphenyl)borane, 3-bromo-7-methyl-3-borabicyclo[3,3,1]nonane, (diethylamino)chloro(cyclopentenyloxy)borane, dichloro(1,2,3,4,5-pentamethyl-2,4-cyclopentadien-1-yl)borane, dibromo(1,2,3,4,5-pentamethyl-2,4-cyclopentadien-1-yl)borane, diiodo(1,2,3,4,5-pentamethyl-2,4-cyclopentadien-1-yl)borane, chlorodicyclopentylborane, chloro(diethylamino)phenylborane, bromodicyclopentylborane, (1-butyl-1-hexenyl)dichloroborane, bromodipentylborane, chlorodiphenylborane, bromodiphenylborane, dichloro(diphenylamino)borane, chloro(diisopropylamino)phenylborane, chloro(dipropylamino)phenylborane, bromobis(2-bromo1-hexenyl)borane, chlorobis(2-chloro-1-hexenyl)borane, chlorobis(2-chloro-1-hexenyl)borane, chlorodicyclohexylborane, chlorodi-1-hexenylborane, chloro(1-ethyl-1-butenyl)(1,1,2trimethylpropyl)borane, chloro-1-hexenyl(1,1,2-trimethylpropyl)-borane, [methyl(4-bromophenyl)amino]chloro(phenyl)borane, chloro-(2-phenylethynyl)(1,1,2-trimethylpropyl)borane, chloro(dibutylamino)phenylborane, chlorooctyl(1,1,2trimethylpropyl)borane, chlorobis(dibutylamino)borane, fluorobis(2,4,6-trimethylphenyl)borane, (1-bromo-1-hexenyl)-bis(2-methylpentyl)borane, (1-bromo-1-hexenyl)dihexylborane, bis(1-butyl-1-hexenyl)chloroborane, and (5-chloro-1-pentenyl)bis(1,2-dimethylpropyl)borane.

Examples of the boron compounds wherein $R^4$ is an alkoxy group include dihydroxymethoxyborane, dimethoxyborane, methoxydimethylborane, methyldimethoxyborane, trimethoxyborane, ethyldimethoxyborane, dimethylaminomethoxymethylborane, [dimethylamino)dimethoxyborane, diethylmethoxyborane, dimethoxypropylborane, bis(dimethylamino)methoxyborane, ethoxydiethylborane, butyldimethoxyborane, diethoxyethylborane, triethoxyborane, cyclopentyldimethoxyborane, methoxydipropylborane, dimethoxyphenylborane, (2-methylcyclopentyl)dimethoxyborane, butoxydiethylborane, ethoxydipropylborane, hexyldimethoxyborane, 3-methoxy-3-borabicyclo[3,3,1]nonane, 9-methoxy-9-borabicyclo[3,3,1]nonane, di-butylmethoxyborane, methoxybis(1-methylpropyl)borane, methoxybis(2methylpropyl)borane, propoxydipropylborane, triisopropoxyborane, tripropoxyborane, butoxydipropylborane, dibutylethoxyborane, diethyl(hexyloxy)borane, dibutoxyethylborane, di-tert-butoxyethylborane, dicyclopentylmethoxyborane, dibutylpropoxyborane, ethoxydipentylborane, (hexyloxy)dipropylborane, tributoxyborane, tri-tert-butoxyborane, tris(2-butoxy)borane, dicyclohexyl(methoxy)boran, dibutyl(2-penten-3-yloxy)borane, dibutoxypentylborane, ethoxydiphenylborane, (2-aminoethoxy)diphenoxyborane, dibutyl(1-cyclo-hexenyloxy)borane, butoxydipentylborane, dibutyl(hexyloxy)borane, tripentyloxyborane, butoxydiphenylborane, (2-methylpropoxy)diphenylborane, diphenoxyphenylborane, triphenoxyborane, tricyclohexyloxyborane, methoxybis(2,4,6-trimethylphenyl)borane, tribenzyloxyborane, tris(3methylphenoxy)borane, trioctyloxyoxyborane, trinonyloxyborane and trioctadecyloxyborane.

Examples of the boron compounds wherein $R^4$ is an alkenyl group include ethynylborane, vinylborane, dihydroxyvinylborane, 2-propenylborane, ethynyldimethoxyborane, methyldivinylborane, trivinylborane, 1-hexenyldihydroxyborane, dimethoxy(3-methyl1,2-butadienyl)borane, diethyl-2-propenylborane, dihydroxy(2phenylethenyl)borane, (diethylamino)diethynylborane, diethylaminodi-1-propynylborane, 2-butenyldiethylborane, diethyl(2-methyl-2-propenyl)borane, bis(dimethylamino)(1-methyl-2-propenyl)borane, 2-butenylbis(dimethylamino)borane, tri-2-propenylborane, tri(2-propenyloxy)borane, diethyl(3-methyl-2-butenyl)borane, 2-propenyldipropylborane, (diethylamino)di-1-propynylborane, butyldi-2-propenylborane, 2-butenyldipropylborane, diethyl(1-ethyl-2-butenyl)borane, (2-methyl-2propenyl)dipropylborane, diethyl(1,1-dimethyl-3buten-1-yloxy)borane, diethyl(1-hexen-4-yloxy)borane, 9-(2-propenyl)-9-borabicyclo[3,3,1]nonane, dibutyl-2-propenylboran, (3-methyl-2-butenyl)dipropylborane, 9-(2-buteny)-9-borabicyclo[3,3,1]nonane, tri-2-butenylborane, tris(2-methyl-2-propenyl)borane, hexyldi-2-propenylborane, 2-butenyldibutylborane, bis(1,2-dimethylpropyl)(2-phenylethenyl)borane, and bis(1,2-dimethylpropyl)-1-octenylborane.

Examples of the boron compounds wherein $R^4$ represents an alkylamino group or an amino group include aminoborane, diaminoborane, aminodimethylborane, (dimethylamino)borane, dimethyl(methylamino)borane, methylbis(methylamino)borane, tris(methylamino)borane, (dimethylamino)dimethylborane, bis(dimethylamino)borane, bis(dimethylamino)methylborane, aminodipropylboran, (diethylamino)dimethylborane, (dimethylamino)diethylborane, tris(diethylamino)borane, isopropylbis(dimethylamino)borane, dimethyl(phenylamino)borane, bis(methylamino)phenylborane, bis(dimethylamino)-1pyrrolylborane, aminodibutylborane, diethylaminodiethylborane, dimethylaminodipropylborane, bis(dimethylamino)phenylborane, dibutyl(dimethylamino)borane, di-tert-butyl(dimethylamino)borane, dibutyl(diethylamino)borane, tris(diethylamino)borane, tris(ethylamino)borane,diethylaminodiphenylborane and aminobis(2,4,6-trimethylphenyl)borane.

Examples of the boron compounds wherein $R^4$ represents a hydroxy group include boric acid, hydroxyborane, dihydroxy(methyl)borane, hydroxydimethylborane, ethyldidroxyborane, dihydroxypropylborane, 2-furanyldihydroxyborane, diethylhydroxyborane, butyldihydroxyborane, cyclopentyldihydroxyborane, pentyldihydroxyborane, (3-aminophenyl)dihydroxyborane, phenyldihydroxyborane, heptyldihydroxyborane, dihydroxy(2-phenylethyl)borane, dihydroxy(1-naphthalenyl)borane, hydroxybis(2,4,6-trimethylphenyl)borane and hydroxydiphenylborane.

Examples of the boron compounds wherein $R^4$ represents an alkyl group include methylborane, dimethylborane, ethylborane, trimethylborane, diethylborane, ethyldimethylborane, diethylmethylborane, 3-methyl-2-butylborane, triethylborane, (1,1,2-trimethylpropyl)borane, dibutylborane, triisopropylborane, tripropylborane, bis(3-methyl-2-butyl)borane, bis(1,1,2-tri-methylpropyl)borane, tri-tert-butylborane, tributylborane, tris(1-methylpropyl)borane, tris(2-methylpropyl)borane, tripentylborane, tris(1,2-dimethylpropyl)borane, trihexylborane and trioctylborane.

Examples of the boron compounds wherein $R^4$ represents a cycloalkyl group include cyclopentylborane, cyclohexylborane, dicyclohexylborane, cyclohexyl(1,1,2-trimethylpropyl)borane, tricyclopentylborane, and tricyclohexylborane.

Examples of the boron compounds wherein $R^4$ represents an aryl group include tri-1-naphthylborane, tris(2,4,6-trimethylphenyl)borane, tribenzylborane, tris(4-methylphenyl)borane, triphenylborane, phenylborane and ethyldiphenylborane.

An example of the boron compound wherein $R^4$ represents a hydrogen atom is borane.

Examples of $(R^4BO)_3$ include boroxine, trifluoroboroxine, trimethylforoxine, trimethoxyboroxine, triethylboroxine, triethoxyboroxine, triphenylboroxine, triphenoxyboroxine, tris(4-ethenylphenyl)boroxine, tris(dimethylamino)boroxine, tributylboroxine, tributoxyboroxine, and tricyclohexylboroxine.

Examples of

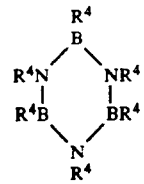

include 2,4,6-trichloroborazine, 2,4,6-tribromoborazine, 2,4,6-trifluoroborazine, borazine, 1-methlborazine, 2,4,6-trichloro-1,3,5-trimethylborazine, 2,4,6-trifluoro-1,3,5-trimethylborazin, 1,3,5-trimethylborazine, 2,4,6-trimethylborazine, 2,4,6-trimethoxyborazine, 2,4-dichloro-1,3,5,6-tetramethylborazine, 2-chloro-1,3,4,5,6-pentamethylborazine, 2,4,6-trichloro1,3,5-triethylborazine, hexamethylborazine, 1,3,5-triethylborazine, ,4,6-triethylborazine, 1,3,5-tripropylborazine, 2,4,6-triethyl-1,3,5-trimethylborazine, 1,3,5-tributyl-2,4,6-trichloroborazine, hexaethylborazine, 2,4,6-trichloro 1,3,5-triphenylborazine, 2,4,6-triphenylborazine, 2,4,6-tri(diethylamino)borazine, 2,4,6-tri(bis(trimethylsilyl)amino)borazine, 2,4,6-tris(dimethylamino)-1,3,5-trimethylborazine, and 1,3,5-trimethyl-2,4,6-triphenylborazine.

Examples of $B(R^4)_3:L$ include borane-phosphine, boranehydrazine, trifluoroborane-methanol, cyanoborane-ammonia, difluoroborane-methylamine, borane-methylamine, tribromoboranedimethylsulfide, trichloroborane-dimethylsulfide, trifluoroborane-dimethyl ether, trifluoroborane-ethanol, borane-isocyanomethane, dibromoborane-dimethylsulfide, dichloroborane-dimethylsulfide, trichloroborane-dimethylamine, trifluoroborane-ethylamine, cyanoborane-methylamine, bromoborane-dimethylsulfide, chloroborane-dimethylsulfide, difluoroborane-dimethylamine, iodoborane-dimethylsulfide, chloroborane-dimethylamine, boranedimethylamine, borane-dimethylphosphine, tribromoborane-trimethylphosphine, tribromoborane-trimethylamine, trichloroboranetrimethylamine, trichloroborane-trimethylphosphine, trifluoroborane-trimethylamine, trifluoroborane-trimethylphosphine, triiodoborane-trimethylphosphine, cyanoborane-dimethylamine, difluoroborane-trimethylamine, bromoborane-trimethylphosphine, chloroborane-trimethylphosphine, fluoroborane-trimethylamine, iodoborane-trimethylamine, iodoborane-trimethylphosphine, borane-trimethylamine, trimethylborane-ammonia, trimethoxyborane-ammonia,borane-trimethylphosphite, boranetrimethylphosphine, trifluoroborane-2-methylimidazole, trifluoroborane-tetrahydrofuran, chloroborane-tetrahydrofuran, trichloroborane-diethyl ether, trifluoroborane-diethyl ether, dibromoborane-diethyl ether, dichloroborane-diethyl ether, cyanoborane-trimethylamine, bromoborane-diethyl ether, dibromoborane-trimethylamine, dibromomethylboranetrimethylphosphine, chloroborane-diethyl ether, borane-tertbutylamine, borane-diethylamine, tribromoborane-pyridine, trichloroborane-pyridine, trifluoroborane-pyridine, boranepyridine, borane-4-aminopyridine, bromodimethylboranetrimethylphosphine, dichlorocyanoborane-pyridine, trifluoroboranephenol, cyanoborane-pyridine, dibromomethylborane-pyridine, borane-4-methylpyridine, trifluoroborane-1-hexanol, tribromoborane-triethylamine, trichloroborane-triethylamine, chloroborane-triethylamine, borane-triethylamine, trimethylborane-trimethylamine, borane-tris(dimethylamino)phosphine, trifluoroboranemethoxybenzene, trifluoroborane-4-methylaniline, borane-2,6-dimethylpyridine, trifluoroborane-dibutyl ether, phenyldichloroborane-triethylamine, tribromoboranetriphenylphosphine, trichloroborane-triphenylphosphine, trifluoroborane-triphenylphosphine, borane-triphenylamine, borane-triphenylphosphine, trimethylborane-triphenylamine, triphenylborane-trimethylamine, triphenylborane-pyridine, and triphenylborane-triethylamine. In addition to the abovedescribed compounds, tetraborane (10), pentaborane (9), pentaborane (11), hexaborane (10), hexaborane (12), octaborane (12), octaborane (18), isononaborane (15), nonaborane (15), decaborane (14), 1,1'-bipentaborane (9), 1,2'-bipentaborane (9), 2,2'-bipentaborane (9), 1-carbahexaborane (7), 2-carbahexaborane (9), 1,2-dicarbahexaborane (6), 1,2-dicarbapentaborane (7), 2,4-dicarbaheptaborane (7), 2,3-di-carbahexaborane (8), 1,7-dicarbaoctaborane (8), 1,2-dicarbadodecaborane (12), 1,7-dicarbadodecaborane (12) and 1,12-dicarbadodecaborane (12) can offer good results.

Most of these boron compounds are commercially available, and those which are not commercially available can be prepared in the same manner as with the conventionally available ones.

The polysilazane and the boron compound are used for reaction in such a proportion that the atomic ratio B/Si is 0.01-3, preferably 0.05-2, more preferably 0.1-1. An amount of the boron compound providing a B/Si atomic ratio in excess of 3 does not give any advantage since the excess boron compound does not accelerate the reaction but merely remain unreacted. With too small an amount of the boron compound below 0.01, the reaction cannot proceed satisfactory.

The reaction for the production of the polyborosilazane may be carried out in the presence or absence of a solvent. For reasons of easiness in controlling the reaction and of prevention of the formation of gel, the use of an organic solvent is advisable. Any organic solvent may be used as long as it is inert both to the polysilazane and the boron compound. Suitable solvents include, for example, hydrocarbons, halogenated hydrocarbons, ethers and sulfur-containing solvents. The reaction temperature and pressure are not specifically limited, though the use of a temperature below the boiling point of the boron compound or the solvent is desirable.

The structure of the polyborosilazane thus produced varies with the kinds of the raw material polysilazane and boron compound. Monofunctional polymers have structures shown below, in which pendant groups are bound to the Si and/or N of the polysilazane skeletal units:

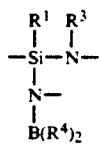

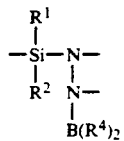

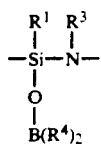

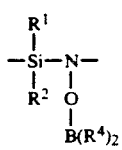

Bifunctional or trifunctional polymers have cyclic and/or cross-linked structures in which B atom is linked to the polysilazane skeletal units. In the cyclic structure, two functional groups of one molecule of a boron compound are linked to neighboring silicon and nitrogen atoms of the polysilazane skeletal units. In the cross-linked structure, two or more functional groups of a boron compound are bound to two or more polysilazane skeletons. Such structures may be represented as follows:

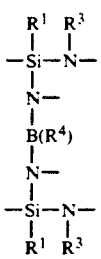

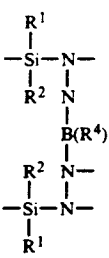

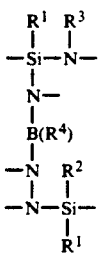

-continued

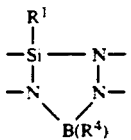

A trifunctional polymer may contain one or more of the following structures.

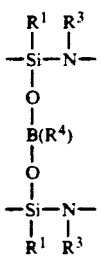

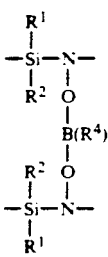

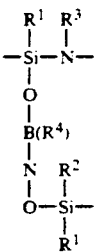

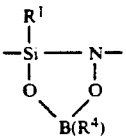

Preferred polyborosilazanes are soluble in organic solvents, have a B/Si atomic ratio of 0.01-3 and a number average molecular weight of about 200-500,000 and contain (a) skeletal groups of repeating units represented by the general formula:

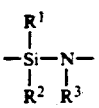

wherein $R^1$, $R^2$ and $R^3$, independently from each other, represent hydrogen, hydrocarbyl, substituted hydrocarbyl, alkylsilyl, alkylamino or alkoxy, with the proviso that at least one of $R^1$, $R^2$ and $R^3$ is hydrogen and (b) one or more bridges cross-linking said skeletal groups and selected from the group consisting of those of the formulas:

 (i)

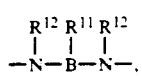 (ii)

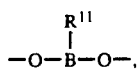 (iii)

and

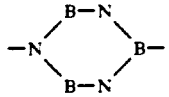 (iv)

wherein $R^{11}$ represents hydrogen, halogen, alkyl, alkenyl, cycloalkyl, aryl, alkoxy, alkylamino, hydroxyl or amino, $R^{12}$ represents a residue bound to the nitrogen atom of $R^{11}$ having a nitrogen atom, and wherein at least two of the six bonds of the group (iv) are used for the crosslinkage with the remaining bond or bonds, if any, being linked to hydrogen, halogen, alkyl, alkenyl, cycloalkyl, aryl, alkoxy, alkylamino, hydroxyl or amino, said bridge or bridges being attached to silicon atoms and/or nitrogen atoms of said repeating units.

The above-described polyborosilazane is processed into a desired shaped body by a method which includes solidifying a raw material containing the above polyborosilazane in a mold cavity and calcining the solidified mass.

The raw material may further contain a reinforcing powder such as ceramic powder and/or a hardener. Examples of such ceramic powder include metal nitrides, metal carbides and metal oxides. The use of the ceramic powder can prevent the occurrence of cracks during succeeding calcination and can improve mechanical strengths of the molded body. The hardener may be, for example, an organic amine such as an alkyl amine or an alkyldiamine; an acid anhydride such as oxalic anhydride or malonic anhydride; an isocyanate such as methyl isocyanate or dimethylsilyldiisocyanate; a thiol such as butane dithiol or benzene dithiol, an imide such as malonimide or succinimide; a metal alkoxide such as of an element of the group IIa, III, IV or V of the Periodic Table; or an inorganic halide such as of iron, cobalt, nickel, copper, silver, gold, mercury, zinc, ruthenium, palladium, indium, titanium, hafnium, zirconium, aluminum, boron or phosphorus. The amount of the reinforcing powder is generally 0.1-60%, preferably 10-40% based on the total weight of the ceramic matrix and the powder.

The raw material is placed into a mold cavity and is solidified and simultaneously molded. The solidification conditions involving temperature, pressure, environmental atmosphere and period of time may vary according to the kind of the polyborosilazane used and amount and kind of the hardener or reinforcing powder.

When a solid polyborosilazane is used, it is first dissolved in an organic solvent such as a hydrocarbon, a halogenated hydrocarbon or an ether. The solution is then poured into the mold cavity and is heated under a reduced pressure or ambient pressure to remove the organic solvent, thereby to obtain a solidified and molded product.

When the polyborosilazane to be used is a liquid, it is filled in a mold cavity and gradually heated from room temperature to about 400° C. at a pressure up to about 10 atm. for a period of time of about 0.5-72 hours in the atmosphere of an inert gas such as nitrogen or argon; a reducing gas such as ammonia, methlamine or hydrazine; an oxidizing gas such as air, oxygen or ozone; or a mixed gas of the above. If desired, the solid polyborosilazane as such may be filled in the mold cavity and heated gradually to about 400° C. at a pressure of up to 10 atm. in a suitable atmosphere as exemplified above.

Any known mold can be used for the above solidification. It is advisable to coat the inside of the mold cavity with a mold releasing agent such as a silicone-based agent or a grease with or without dilution with an organic solvent.

The thus formed solidified product is then gradually heated to 600°-1750° C. at a heating rate of 20° C./min or less, preferably 5° C./min or less and maintained at that temperature for 48 hours or less, thereby to obtain a desired molded body. A calcination temperature exceeding 1750° C. is not desirable because of a possible occurrence of decomposition. Too low a calcination temperature below 600° C. is also disadvantageous because of insufficient formation of ceramic and insufficient increase of mechanical strengths. The thus obtained ceramic molded body may be impregnated with the above polyborosilazane, followed by solidification and calcination, so that the surface portion of the molded body becomes more dense.

Formation of the ceramic fibers will now be described. At the outset, the above raw material polyborosilazane is processed to form a solution suitable for spinning. The spinning solution may be obtained by concentrating a polyborosilazane solution obtained as a reaction product to a desired viscosity suitable for spinning. Alternately, the product polyborosilazane solution is concentrated to dryness by the removal of the solvent, the dried solids being subsequently dissolved in a suitable inert solvent to obtain the spinning solution. Examples of suitable solvents for the formation of the spinning solution include hydrocarbons, halogenated hydrocarbons, ethers and sulfur compounds.

The amount of the polyborosilazane in the spinning solution is not critical as long as the solution can exhibit suitable spinnability. Generally, however, a concentration of 50-90% by weight gives good results. Optimum concentration varies with the number average molecular weight, molecular distribution and molecular structure of the raw material polyborosilazane. While the resulting solution as such exhibits good spinnability suitable for dry spinning, a spinning assistant may be added to the solution in a small amount for improving the spinnability. Illustrative of suitable spinning assistants are polyethers, polyamides, polyesters, vinyl polymers, polythioethers and polypeptides.

Before spinning, the spinning solution is desirably subjected to defoaming, filtration and other treatments for the removal of gels and foreign matters which will adversely affect the spinnability. The spinning is advantageously effected by a dry spinning method. Alternatively, centrifugal or blow spinning methods can be adopted. In dry spinning, the solution is discharged through a spinning nozzle to a cylinder and the spun fibers are continuously wound around a roll. The nozzle diameter, spinning speed and winding speed vary with the property of the spinning solution and with the intended thickness of the spun fibers. A nozzle diameter of 0.035-0.5 mm, preferably 0.05-0.3 mm and a winding speed of 30-5000 m/min, preferably 60-2500 m/min are generally used. The inside of the cylinder into which the fibers are discharged from the spinning nozzle can be maintained in any desired atmosphere such as air. It is preferable to maintain the inside of the cylinder in a dried air atmosphere, an ammoniacal atmosphere or an inert gas atmosphere for the purpose of controlling the infusiblization and solidification of the spun fibers. Steam or vapors of an inert solvent such as used for the preparation of the spinning solution can also be incorporated into the above atmosphere.

The cylinder can be heated to maintain the temperature of the inside of the cylinder in a range so that the solidification of the spun fibers can be suitably controlled. The spinning solution generally has a temperature of 20°-300° C., preferably 30°-200° C. and the temperature within the cylinder is generally 20°-300° C., preferably 40°-250° C.

Since the spun fibers wound around the take up roll generally contain the solvent, they are dried in a suitable atmosphere such as in air, vacuum, dried air, ammonia or an inert gas. The drying is suitably performed with heating to accelerate the drying. Good results are obtainable with a heating temperature of 20°-500° C. It is also preferred that the drying be carried out while maintaining the fibers under uniform tension for preventing the drying fibers from twisting and from being curved or bent. The tension is generally in the range of 1 $g/mm^2$ to 50 $kg/mm^2$.

The thus obtained polyborosilazane fibers are then pyrolyzed and sintered to form ceramic fibers. The pyrolysis is carried out in the atmosphere of an inert gas such as nitrogen or argon, ammonia, hydrogen or a mixture thereof, or under vacuum. The pyrolysis is performed at a temperature of 500°-1800° C., preferably 800°-1600° C. for 5 minutes to 10 hours.

In the pyrolysis step, almost all volatile components contained in the precursor fibers are vaporized at a temperature of 300°-600° C. This causes the fibers to shrink, resulting the twisting or bending of the fibers. Thus, it is advantageous to maintain the fibers under tension of 1 $g/mm^2$ to 50 $kg/mm^2$.

A shaped body in the form of coating according to the present invention may be obtained by applying a coating composition containing the polyborosilazane and optionally a solvent, a filler and the like conventional additives onto a surface of a substrate. The coated composition is subsequently dried and pyrolyzed to form a ceramic layer over the surface of the substrate.

A shaped body in the form of a composite article according to the present invention may be obtained by using the above polyborosilazane as a binder. Thus, powders, whiskers, fibers or fabrics of ceramics such as metal carbides or nitrides are mixed or impregnated with the polyborosilazane or a solution thereof, shaped into a desired form and pyrolyzed to obtain a composite article.

The following examples will further illustrate the present invention.

REFERENCE EXAMPLE 1

To a four-necked 1 liter flask equipped with a gas feed conduit, a mechanical stirrer and a Dewar condenser, an oxygen-free, dry nitrogen gas was fed to replace the air within the flask therewith. After charging 490 ml of deaerated, dry pyridine, the flask was cooled in an ice bath. Then, 51.6 g of dichlorosilane was added into the flask to form a white, solid precipitate of an adduct ($SiH_2Cl_2.2C_5H_5N$). Subsequently, with stirring and cooling the reaction mixture in the ice bath, 51.0 g of ammonia which had been passed successively through a sodium hydroxide-containing tube and an active carbon-containing tube was bubbled through the reaction mixture within the flask.

After completion of the reaction, the reaction mixture was centrifuged, and the supernatant was washed with dry pyridine, followed by filtration in a nitrogen atmosphere to give 850 ml of a filtrate containing perhydropolysilazane. When the solvent was removed from the filtrate (5 ml) by evaporation in vacuo, 0.102 g of resinous solid, perhydropolysilazane was obtained. Gel permeation chromatography of the thus obtained polymer revealed that the polysilazane had a number-average molecular weight of 980. An infrared spectrum of this polymer (solvent: dry xylene; concentration of the perhydropolysilazane: 10.2 g/liter) indicated peaks at a wavenumber of 3350 ($cm^{-1}$) (apparent absorptivity coefficient $\epsilon = 0.557$ $g^{-1}cm^{-1}$) and at 1175 $cm^{-1}$ based on NH, a peak at 2170 ($\epsilon = 3.14$) based on SiH, a broad peak at 1020-820 based on SiH and SiNSi. A $^1$HNMR (proton nuclear magnetic resonance) spectrum of this polymer (60 MHz; solvent: $CDCl_3$; reference substance: TMS) indicated broad peaks at $\delta$ of 4.8, 4.4 (br, SiH) and 1.5 (br, NH).

REFERENCE EXAMPLE 2

The reaction was conducted using the same apparatus used in Reference Example 1 as follows. In the four-necked flask shown in Reference Example 1, 450 ml of dry tetrahydrofuran was charged, and the flask was cooled in a dry ice-methanol bath. Then 46.2 g of dichlorosilane was added into the flask. Sub-sequently, with stirring and cooling in the bath, 44.2 g of anhydrous methylamine was bubbled as a mixture gas with nitrogen through the reaction mixture within the flask. After completion of the reaction, the reaction mixture was centrifuged and the supernatant was washed with dry tetrahydrofuran, followed by filtration in a nitrogen atmosphere to give 820 ml of a filtrate containing N-methylsilazane. When the solvent was removed from the filtrate by evaporation in vacuo, 8.4 g of viscous oil was obtained. Gel permeation chromatography of the N-methylsilazane revealed that the N-methylsilazane had a number-average molecular weight of 1100.

REFERENCE EXAMPLE 3

To a four-necked 1 liter flask equipped with a gas feed conduit, a mechanical stirrer and a Dewar condenser, an oxygen-free, dry nitrogen gas was fed to replace the air within the flask therewith. After charging 300 ml of dry dichloromethane and 24.3 g (0.211 mol) of methyldichlorosilane, the flask was cooled in an ice bath. Then, with stirring, 18.1 g (1.06 mol) of ammonia which had been passed successively through a sodium hydroxide-containing tube and an active carbon-containing tube was bubbled through the reaction mixture within the flask. After completion of the reaction, the reaction mixture was centrifuged and the supernatant was washed with dry dichloro-methane, followed by filtration in a nitrogen atmosphere. When the solvent was removed from the filtrate by evaporation in vacuo, 8.81 g of colorless, transparent methyl(hydro)silazane was obtained. Gel permeation chromatography of the methyl(hydro)silazane revealed that the methyl(hydro)silazane had a number-average molecular weight of 380.

REFERENCE EXAMPLE 4

To a four-necked 1 liter flask equipped with a gas feed conduit, a mechanical stirrer, a drop funnel and a condenser, an oxygen-free, dry nitrogen gas was fed to replace the air within the flask therewith. 200 ml of dry chlorobenzene and 50 g of boron trichloride were charged into the flask and cooled in an ice bath. Then, 17 g of dry acetonitrile was added dropwise to form a white, solid precipitate of an adduct ($CH_2CN.BCl_3$) Subsequently, 22 g of ammonium chloride which had been dried at 110° C. was added to the mixture in the flask and 5 this was reacted under reflux for 5 hours to obtain a colorless, transparent solution. After cooling to room temperature 45 ml of diethylamine was added dropwise. After completion of the reaction, the reaction mixture was filtered in a nitrogen atmosphere and the filtrate was concentrated by evaporation of the solvent, thereby to give 21 g of B-tris(diethylamino)-borazine in the form of a colorless, transparent liquid.

EXAMPLE 1

600 ml of a solution of the perhydropolysilazane obtained in Reference Example 1 in pyridine (concentration of perhydropolysilazane: 5.20% by weight) was charged in a one (1) liter autoclave, to which was added 30 ml (0.254 mol) of trimethyl borate. The mixture was stirred for 3 hours at 160° C in a closed system. After cooling the reaction mixture to room temperature, 500 ml of dry o-xylene was added thereto. When the solvent was removed at a temperature of 50°-70° C. under a pressure of 3-5 mmHg, 38 g of polyborosilzane was obtained in the form of white solids. The polyborosilazane was found to have a number average molecular weight of 2100.

The thus obtained polyborosilazane was dissolved in toluene and the solution was adjusted to a predetermined concentration. The solution was then poured into a mold cavity of a mold formed of a tetrafluoroethylene. Then the solvent was removed at 70° C. under a nitrogen stream to obtain a transparent shaped mass having a size of 7 mm$\phi \times 8$ mm. This was heated to 1000° C. at a heating rate of 0.1° C./min under an ammonia gas stream and then to 1750° C. at a heating rate of 10° C./min under a nitrogen stream and finally maintained at that temperature for 1 hour, thereby obtaining black, disk-like ceramic body. Elementary analysis of the shaped ceramic body gave the following results (in terms of % by weight):

Si: 50.5, N: 38.7, C: 0.60, 0: 2.40, B: 6.80

Powder X-ray diffraction analysis revealed that the shaped body was amorphous. The X-ray small angle scattering intensity ratio was less than 20 at scattering angles of 1° and 0.5°.

EXAMPLE 2

500 ml of a solution of the perhydropolysilazane obtained in Reference Example 1 in pyridine (concentration of perhydropolysilazane: 4.90% by weight) was charged in a one (1) liter autoclave, to which was added 45 ml (0.165 mol) of tris(butylamine)borane. The mixture was reacted at 120° C. for 3 hours with stirring in a closed system. The reaction mixture was treated in the same manner as that in Example 1 to obtain 36 g of polyborosilazane in the form of white solids. The polyborosilazane was found to have a number average molecular weight of 2350.

The thus obtained polyborosilazane was dissolved in toluene and the solution was adjusted to a predetermined concentration. The solution was then poured into a mold cavity of a mold formed of a tetrafluoroethylene. Then the solvent was removed at 100° C. under a nitrogen stream to obtain a transparent shaped mass having a size of 20 mm$\phi \times$10 mm. This was heated to 1750° C. at a heating rate of 3° C./min and a pressure of 2000 atm. in the atmosphere of nitrogen and maintained at that temperature for 1 hour to effect HIP treatment, thereby obtaining black, disk-like ceramic body. Elementary analysis of the shaped ceramic body gave the following results (in terms of % by weight):

Si: 50.6, N: 39.3, C: 0.70, O: 2.15, B: 6.75

Powder X-ray diffraction analysis revealed that the shaped body 30 was amorphous. The X-ray small angle scattering intensity ratio was less than 20 at scattering angles of 1° and 0.5°.

EXAMPLE 3

600 ml of a solution of the N-methylsilazane obtained in Reference Example 2 in gamma-picoline (concentration of N-methylsilazane: 8.60% by weight) was charged in a one (1) liter autoclave, to which was added 130 ml (0.482 mol) of trisbutylborate. The mixture was reacted at 160° C. for 5 hours with stirring in a closed system. The reaction mixture was treated in the same manner as that in Example 1 to obtain 48 g of polyborosilazane in the form of light yellow solids. The 5 polyborosilazane was found to have a number average molecular weight of 1880.

The thus obtained polyborosilazane was pulverized in the atmosphere of nitrogen and filled in a hot-press mold formed of tungsten. The polyborosilazane within the mold was heated to 1500° C. at a heating rate of 5° C./min in the atmosphere of ammonia gas, then to 1750° C. at a heating rate of 10° C./min in the atmosphere of nitrogen and maintained at that temperature for 3 hour to effect pyrolysis, thereby obtaining black, disk-like ceramic body (70 mm$\phi \times$8 mm). Elementary analysis of the shaped ceramic body gave the following results (in terms of % by weight):

Si: 48.9, N: 38.2, C: 0.40, O: 2.50, B: 7.30

Powder X-ray diffraction analysis revealed that the shaped body was amorphous. The X-ray small angle scattering intensity ratio was less than 20 at scattering angles of 1° and 0.5°.

EXAMPLE 4

300 ml of a solution of the methylhydrosilazane obtained in Reference Example 3 in o-xylene (concentration of methylhydrosilazane: 6.40% by weight) was charged in a one (1) liter four-necked flask placed in an ice bath, to which was added boron trichloride little by little for 2 hours in a total amount of 50 g (0.427 mol). The mixture was reacted at 25° C. for 3 hours with stirring. To the reaction mixture was further added 200 ml of 1,1,1,3,3,3-hexamethylsilazane and the mixture was reacted at 80° C. for 3 hours. The resulting mixture was filtered to remove precipitates and the filtrate was concentrated under vacuo to obtain 58 g of polyborosilazane in the form of light yellow solids. The polyborosilazane was found to have a number average molecular weight of 4800.

The thus obtained polyborosilazane was dissolved in o-xylene and the solution was adjusted to a predetermined concentration. The solution was then poured into a mold cavity of a mold formed of a tetrafluoroethylene. Then the solvent was removed at 80° C. under a nitrogen stream to obtain a transparent shaped mass having a size of 40 mm$\phi \times$8 mm. This was heated to 1750° C. at a heating rate of 0.1° C./min in the atmosphere of nitrogen and maintained at that temperature for 1 hour to effect pyrolysis, thereby obtaining black, disk-like ceramic body. Elementary analysis of the shaped ceramic body gave the following results (in terms of % by weight):

Si: 50.6, N: 25.5, C: 15.4, O: 1.68, B: 6.78

Powder X-ray diffraction analysis revealed that the shaped body was amorphous. The X-ray small angle scattering intensity ratio was less than 20 at scattering angles of 1° and 0.5°.

EXAMPLE 5

600 ml of a solution of the perhydropolysilazane obtained in Reference Example 1 in pyridine (concentration of perhydropolysilazane: 4.70% by weight) and 55 g (0.187 mol) of B-tris(diethylamino)borazine obtained in Reference Example 4 were charged in a one (1) liter autoclave. The mixture was reacted at 80° C. for 2 hours with stirring in a closed system. After cooling to room temperature, the reaction mixture was treated in the same manner as that in Example 1 to obtain 64 g of polyborosilzane in the form of white solids. The polyborosilazane was found to have a number average molecular weight of 2800.

The thus obtained polyborosilazane was dissolved in o-xylene and the solution was adjusted to a predetermined concentration. The solution was then poured into a mold cavity of a mold formed of a tetrafluoroethylene. Then the solvent was removed at 80° C. under a nitrogen stream to obtain a transparent shaped mass having a size of 40 mm$\phi \times$8 mm. This was heated to 600° C. at a heating rate of 0.1° C./min under an ammonia gas stream and then to 1750° C. at a heating rate of 10° C./min under a nitrogen stream and finally maintained at that temperature for 1 hour, thereby obtaining black, disk-like ceramic body. Elementary analysis of the shaped ceramic body gave the following results (in terms of % by weight):

Si: 50.6, N: 35.8, C: 2.50, O: 1.28, B: 5.63 Powder X-ray diffraction pattern showed broad peaks at $2\theta$ of about 20.5°, 31°, 34.5° and 35° (these are considered to be attributed to alpha-Si$_3$N$_4$ and peaks at $2\theta$ of about 35.5° and 36° (these are considered to be attributed to beta-Si$_3$N$_4$). Thus, the ceramic body was found to have a structure in which superfine alpha- and beta-Si3N4 are dispersed in an amorphous domain. The X-ray small angle scattering intensity ratio was less than 20 at scattering angles of 1° and 0.5°.

EXAMPLE 6

800 ml of a solution of the perhydropolysilazane obtained in Reference Example 1 in pyridine (concentration of perhydropolysilazane: 5.50% by weight) was charged in a one (1) liter autoclave, to which was added 34 ml (0.301 mol) of trimethyl borate. The mixture was reacted at 160° C. for 4 hours with stirring in a closed system. After cooling the reaction mixture to room temperature, 500 ml of dry o-xylene was added thereto. When the solvent was removed at a temperature of 50°-70° C. under a pressure of 3-5 mmHg, 43 g of polyborosilzane was obtained in the form of white solids. The polyborosilazane was found to have a number average molecular weight of 2200.

The polyborosilazane thus obtained was dissolved in o-xylene and the solvent was then removed in vacuo. The removal of the solvent was stopped when the solution had desired spinnability. The resultant solution was charged in a defoaming vessel of a dry-spinning device and maintained in quiescent state at 60° C. for about 4 hours to effect defoaming. Then the solution was injected at 40° C. through a nozzle having a nozzle diameter of 0.1 mm into a cylinder maintained at 20° C. under ambient air, and the spun fiber was taken up at a speed of 100 m/min on a bobbin, thereby obtaining a fiber having an average diameter of 10 μm.

While applying a tension of 500 g/mm$^2$, this fiber was heated from room temperature to 600° C. at a heating rate of 180° C./hour in an ammoniacal atmosphere and then to 1700° C. through 3 hours in a nitrogen atmosphere and maintained at 1700° C. for 1 hour to effect pyrolysis, thereby obtaining black ceramic fiber. This fiber was found to have a diameter of about 7 μm, a tensile strength of 200 kg/mm$^2$ and modulus of 33 ton/mm$^2$. An X-ray diffraction analysis revealed that this fiber was amorphous. Elementary analysis of the ceramic fiber gave the following results (in terms of % by weight):

Si: 43.1, N: 34.8, C: 0.60, O: 11.8, B: 7.80

When the pyrolysis was performed at 1800° C., the resulting ceramic fiber gave a powder X-ray diffraction pattern in which broad peaks were present at $2\theta$ of about 20°, 23°, 26.5°, 31°, 34.5°, 35°, 39°, 42° and 43.5° (these are considered to be attributed to alpha-Si$_3$N$_4$ and peaks are present at $2\theta$ of about 23.5°, 27°, 33.5°, 36° and 41.5° (these are considered to be attributed to beta-Si$_3$N$_4$). Thus, the ceramic fiber was found to have a structure in which fine crystals of alpha- and beta-Si$_3$N$_4$ were formed. The X-ray small angle scattering intensity ratio of the ceramic fiber was less than 20 at scattering angles of 1° and 0.5°.

EXAMPLE 7

600 ml of a solution of the N-methylsilazane obtained in Reference Example 2 in pyridine (concentration of N-methylsilazane: 8.30% by weight) was charged in a one (1) liter autoclave, to which was added 120 ml (0.445 mol) of trimethyl borate. The mixture was reacted at 160° C. for 8 hours with stirring in a closed system. After cooling, the reaction mixture was treated in the same manner as that in Example 6 to obtain 55 g of polyborosilzane in the form of light brown solids. The polyborosilazane was found to have a number average molecular weight of 2800.

The polyborosilazane thus obtained was dissolved in toluene and the solvent was then removed in vacuo. The removal of the solvent was stopped when the solution had desired spinnability. The resultant solution was charged in a defoaming vessel of a dry-spinning device and maintained in quiescent state at 60° C. for about 4 hours to effect defoaming. Then the solution was injected at 30° C. through a nozzle having a nozzle diameter of 0.1 mm into a cylinder maintained at 80° C. under ambient air, and the spun fiber was taken up at a speed of 100 m/min on a bobbin, thereby obtaining a fiber having an average diameter of 10μm.

While applying a tension of 300 g/mm$^2$, this fiber was heated from room temperature to 800° C. at a heating rate of 180° C./hour in an ammoniacal atmosphere and then to 1500° C. through 3 hours in a nitrogen atmosphere and maintained at 1700° C. for 1 hour to effect pyrolysis, thereby obtaining black ceramic fiber. This fiber was found to have a diameter of about 8 μm, a tensile strength of 280 kg/mm$^2$ and modulus of 35 ton/mm$^2$. An X-ray diffraction analysis revealed that this fiber was amorphous. Elementary analysis of the ceramic fiber gave the following results (in terms of % by weight):

Si: 44.4, N: 33.5, C: 1.50, O: 12.0, B: 6.60

The pyrolysis was further performed at 1800° C. to give a ceramic fiber whose powder X-ray diffraction pattern was similar to that of Example 6. Thus, the ceramic fiber was found to contain crystals of alpha- and beta-Si$_3$N$_4$. The X-ray small angle scattering intensity ratio of the ceramic fiber was less than 20 at scattering angles of 1° and 0.5°.

EXAMPLE 8

In a 5 liter four necked flask were charged 600 ml of dry o-xylene and 50 g (0.427 mol) of boron trichloride. While cooling in an ice bath, 600 ml of perhydropolysilazane obtained in Reference Example 1 in o-xylene (concentration of perhydropolysilazane: 8.10% by weight) was added dropwise into the flask through 1 hour. The mixture was then reacted at 30° C. for 5 hours with stirring. To the reaction mixture was further added dropwise 450 ml of 1,1,1,3,3,3-hexamethylsilazane through 1 hour and the mixture was reacted under reflux for 4 hours. The resulting mixture was filtered to remove precipitates and the filtrate was concentrated in vacuo to obtain 52 g of polyborosilazane in the form of light yellow solids. The polyborosilazane was found to have a number average molecular weight of 3200.

The polyborosilazane thus obtained was dissolved in o-xylene and the solvent was then removed in vacuo. The removal of the solvent was stopped when the solution had desired spinnability. The resultant solution was charged in a defoaming vessel of a dry-spinning device and maintained in quiescent state at 60° C. for about 4 hours to effect defoaming. Then the solution was injected at 60° C. through a nozzle having a nozzle diameter of 0.1 mm into a cylinder maintained at 80° C. in nitrogen atmosphere, and the spun fiber was taken up at a speed of 100 m/min on a bobbin, thereby obtaining a fiber having an average diameter of 12 μm.

While applying a tension of 500 g/mm$^2$, this fiber was heated from room temperature to 1700° C. at a heating rate of 300° C./hour in a nitrogen atmosphere and maintained at 1700° C. for 1 hour to effect pyrolysis, thereby obtaining black ceramic fiber. This fiber was found to have a diameter of about 9 μm, a tensile strength of 180 kg/mm$^2$ and modulus of 30 ton/mm$^2$. An X-ray diffraction analysis revealed that this fiber was amorphous. Elementary analysis of the ceramic fiber gave the following results (in terms of % by weight):

Si: 46.8, N: 40.3, C: 1.80, O: 2.2, B: 7.75

The pyrolysis was further performed at 1800° C. to give a ceramic fiber whose powder X-ray diffraction pattern was similar to that of Example 6. Thus, the ceramic fiber was found to contain crystals of alpha- and beta-Si$_3$N$_4$ The X-ray small angle scattering intensity ratio of the ceramic fiber was less than 20 at scattering angles of 1° and 0.5°.

EXAMPLE 9

800 ml of a solution of the methylhydrosilazane obtained in Reference Example 3 in o-xylene (concentration of methylhydrosilazane: 4.80% by weight) was charged in a one (1) liter autoclave, to which was added 120 ml (1.19 mol) of pyridine-borane complex. The mixture was reacted at 80° C. for 3 hours with stirring in a closed system. After cooling, the reaction mixture was treated in the same manner as that in Example 6 to obtain 38 g of polyborosilzane in the form of red brown solids. The polyborosilazane was found to have a number average molecular weight of 5600.

The polyborosilazane thus obtained was dissolved in o-xylene and the solvent was then removed in vacuo. The removal of the solvent was stopped when the solution had desired spinnability. The resultant solution was charged in a defoaming vessel of a dry-spinning device and maintained in quiescent state at 60° C. for about 4 hours to effect defoaming. Then the solution was injected at 80° C. through a nozzle having a nozzle diameter of 0.1 mm into a cylinder maintained at 120° C. in a nitrogen atmosphere, and the spun fiber was taken up at a speed of 100 m/min on a bobbin, thereby obtaining a fiber having an average diameter of 15 $\mu$m.

While applying a tension of 300 g/mm$^2$, this fiber was heated from room temperature to 1000° C. at a heating rate of 180° C./hour in an ammoniacal atmosphere and then to 1500° C. through 3 hours in a nitrogen atmosphere and maintained at 1700° C. for 1 hour to effect pyrolysis, thereby obtaining black ceramic fiber. This fiber was found to have a diameter of about 10 $\mu$m, a tensile strength of 320 kg/mm$^2$ and modulus of 40 ton/mm$^2$. An X-ray diffraction analysis revealed that this fiber was amorphous. Elementary analysis of the ceramic fiber gave the following results (in terms of % by weight):

Si: 43.5, N: 38.7, C: 0.70, O: 8.40, B: 6.60

The pyrolysis was further performed at 1800° C. to give a ceramic
fiber whose powder X-ray diffraction pattern was similar to that of Example 6. Thus, the ceramic fiber was found to contain crystals of alpha- and beta-Si$_3$N$_4$. The X-ray small angle scattering intensity ratio of the ceramic fiber was less than 20 at scattering angles of 1° and 0.5°.

EXAMPLE 10

800 ml of a solution of the perhydropolysilazane obtained in Reference Example 1 in o-xylene (concentration of perhydropolysilazane: 8.05% by weight) and 130 g (0.442 mol) of B-tris(diethylamino)borazine obtained in Reference Example 4 were charged in a one (1) liter autoclave. The mixture was reacted at 60° C. for 3 hours with stirring in a closed system. After cooling to room temperature, the reaction mixture was treated in the same manner as that in Example 1 to obtain 64 g 5 of polyborosilzane in the form of light yellow solids. The polyborosilazane was found to have a number average molecular weight of 1800.

The polyborosilazane thus obtained was dissolved in o-xylene and the solvent was then removed in vacuo. The removal of the solvent was stopped when the solution had desired spinnability. The resultant solution was charged in a defoaming vessel of a dry-spinning device and maintained in quiescent state at 60° C. for about 4 hours to effect defoaming. Then the solution was injected at 30° C. through a nozzle having a nozzle diameter of 0.1 mm into a cylinder maintained at 80° C. under ambient air, and the spun fiber was taken up at a speed of 100 m/min on a bobbin, thereby obtaining a fiber having an average diameter of 10 $\mu$m.

This fiber was heated from room temperature to 1650° C. at a heating rate of 180° C./hour in a nitrogen atmosphere and maintained at 1650° C. for 1 hour to effect pyrolysis, thereby obtaining black ceramic fiber. This fiber was found to have a diameter of about 8 $\mu$m, a tensile strength of 220 kg/mm$^2$ and modulus of 28 ton/mm$^2$. An X-ray diffraction analysis revealed that this fiber was amorphous. Elementary analysis of the ceramic fiber gave the following results (in terms of % by weight):

Si 54.3, N: 38.6, C: 0.30, O: 1.68, B: 5.78

The pyrolysis was further performed at 1800° C. to give a ceramic fiber whose powder X-ray diffraction pattern was similar to that of Example 6. Thus, the ceramic fiber was found to contain crystals of alpha- and beta-Si$_3$N$_4$. The X-ray small angle scattering intensity ratio of the ceramic fiber was less than 20 at scattering angles of 1° and 0.5°.

EXAMPLE 11

600 ml of a solution of the methylhydrosilazane obtained in Reference Example 3 in pyridine (concentration of methylhydrosilazane: 6.40% by weight) was charged in a one (1) liter autoclave, to which was added 15 g (0.123 mol) of decaborane. The mixture was reacted at 80° C. for 3 hours with 5 stirring in a closed system. After cooling, the reaction mixture was treated in the same manner as that in Example 6 to obtain 39 g of polyborosilzane in the form of light brown solids. The polyborosilazane was found to have a number average molecular weight of 2400.

The polyborosilazane thus obtained was dissolved in o-xylene and the solvent was then removed in vacuo. The removal of the solvent was stopped when the solution had desired spinnability. The resultant solution was charged in a defoaming vessel of a dry-spinning device and maintained in quiescent state at 60° C. for about 4 hours to effect defoaming. Then the solution was injected at 40° C. through a nozzle having a nozzle diameter of 0.1 mm into a cylinder maintained at 100° C. in ambient air, and the spun fiber was taken up at a speed of 200 m/min on a bobbin, thereby obtaining a fiber having an average diameter of 10 $\mu$m.

While applying a tension of 300 g/mm$^2$, this fiber was heated from room temperature to 600° C. at a heating rate of 60° C./hour in an ammoniacal atmosphere and then to 1700° C. through 3 hours in a nitrogen atmosphere and maintained at 1700° C. for 1 hour to effect pyrolysis, thereby obtaining black ceramic fiber. This fiber was found to have a diameter of about 8 $\mu$m, a tensile strength of 280 kg/mm$^2$ and modulus of 40 ton/mm$^2$. An X-ray diffraction analysis revealed that this fiber was amorphous. Elementary analysis of the ceramic fiber gave the following results (in terms of % by weight):

Si 40.2, N: 41.5, C: 0.80, O: 3.20, B: 14.3

The pyrolysis was further performed at 1800° C. to give a ceramic fiber whose powder X-ray diffraction pattern was similar to that of Example 6. Thus, the ceramic fiber was found to contain crystals of alpha- and beta-Si$_3$N$_4$. The X-ray small angle scattering intensity ratio of the ceramic fiber was less than 20 at scattering angles of 1° and 0.5°.

What is claimed is:

1. A shaped body comprising a substantially amorphous ceramic comprising Si, N, C, O and B in amounts providing the following atomic ratios:
N/Si: 0.05 to 2.5, B/Si: 0.01-3, C/Si: 1.5 or less, and O/Si: 1.0 or less, said Si and N being present in said ceramic in the form of amorphous silicon nitride, said shaped body having the capability of remaining substantially amorphous after being subjected to heating of a temperature of 1,500°–1,750° C.

2. A shaped body as set forth in claim 1, wherein said ceramic exhibits an X-ray small angle scattering such that the ratio of the intensity of the small angle scattering of the shaped body to that of air is 1 to 20 at scattering angles of 0.5° and 1°.

3. A shaped body as set forth in claim 1, further comprising fine crystallites of alpha and beta-$Si_3N_4$ having a diameter of 500 Å or less.

4. A shaped body as set forth in claim 1, wherein said ceramic further comprises H in an amount providing the following atomic ratio:

H/Si: 0.1 or less.

5. A shaped body as set forth in claim 1, and obtained by a method including the steps of:

providing a polyborosilazane having a B/Si atomic ratio of 0.01–3 and a number average molecular weight of about 200–500,000 and containing (a) skeletal groups of repeating units represented by the general formula:

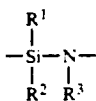

wherein $R^1$, $R^2$ and $R^3$, independently from each other, represent hydrogen, hydrocarbyl, substituted hydrocarbyl, alkylsilyl, alkylamino or alkoxy, with the proviso that at least one of $R^1$, $R^2$ and $R^3$ is hydrogen and (b) one or more bridges cross-linking said skeletal groups and selected from the group consisting of those of the formulas:

and

wherein $R^{11}$ represents hydrogen, halogen, alkyl, alkenyl, cycloalkyl, aryl, alkoxy, alkylamino, hydroxyl or amino, $R^{12}$ represents a residue bound to the nitrogen atom of $R^{11}$ having a nitrogen atom, and wherein at lest two of the six bonds of the group (iv) are used for the crosslinkage with the remaining bond or bonds, if any, being linked to hydrogen, halogen, alkyl, alkenyl, cycloalkyl, aryl, alkoxy, alkylamino, hydroxyl or amino, said bridge or bridges being attached to silicon atoms and/or nitrogen atoms of said repeating units;

solidifying said polyborosilazane into a predetermined shape; and sintering said shaped polyborosilazane.

6. A shaped body as set forth in claim 5, which is in the form of a fiber.

7. A shaped body as set forth in claim 5, further containing a reinforcing material homogeneously dispersed in said shaped body with said ceramic serving as a binder.

8. A shaped body as set forth in claim 5, which is a composite including a substrate and a layer coated over a surface of said substrate and formed of said silicon nitridebased ceramic.

9. The shaped body of claim 1 formed by shaping a polyborosilazane to form a shaped intermediate; and pyrolyzing said shaped intermediate by heating at a temperature of 500°–1800° C. to form said ceramic shaped body.

* * * * *

UNITED STATES PATENT AND TRADEMARK OFFICE
CERTIFICATE OF CORRECTION

PATENT NO. : 5,128,286
DATED : July 7, 1992
INVENTOR(S) : Funayama et al It is certified that error appears in the above-identified patent and that said Letters Patent is hereby corrected as shown below:

Col 2, line 6, delete the heading "SUMMARY OF THE INVENTION";

lines 22 and 23, delete the heading "DESCRIPTION OF THE PREFERRED EMBODIMENT";

between lines 52 and 53 insert the heading --SUMMARY OF THE INVENTION--; and between lines 66 and 67 insert the heading --DESCRIPTION OF THE PREFERRED EMBODIMENT--.

Signed and Sealed this

Ninth Day of November, 1993

*Attest:*

BRUCE LEHMAN

*Attesting Officer*     *Commissioner of Patents and Trademarks*